(12) United States Patent
Bryant et al.

(10) Patent No.: US 11,080,440 B2
(45) Date of Patent: Aug. 3, 2021

(54) CHARACTERIZING FLUID FLOW AT FIELD CONDITIONS

(71) Applicant: International Business Machines Corporation, Armonk, NY (US)

(72) Inventors: Peter William Bryant, Rio de Janeiro (BR); William Fernando Lopez Candela, Rio de Janeiro (BR); Michael Engel, Rio de Janeiro (BR); Mathias Steiner, Rio de Janeiro (BR)

(73) Assignee: International Business Machines Corporation, Armonk, NY (US)

( * ) Notice: Subject to any disclaimer, the term of this patent is extended or adjusted under 35 U.S.C. 154(b) by 443 days.

(21) Appl. No.: 15/634,737

(22) Filed: Jun. 27, 2017

(65) Prior Publication Data
US 2018/0373821 A1 Dec. 27, 2018

(51) Int. Cl.
| | |
|---|---|
| *G06F 17/18* | (2006.01) |
| *G01N 11/08* | (2006.01) |
| *G06F 111/10* | (2020.01) |
| *G06F 113/08* | (2020.01) |
| *G06F 30/20* | (2020.01) |

(52) U.S. Cl.
CPC ............ *G06F 30/20* (2020.01); *G01N 11/08* (2013.01); *G06F 17/18* (2013.01); *G06F 2111/10* (2020.01); *G06F 2113/08* (2020.01)

(58) Field of Classification Search
CPC ................................. G06F 17/18; G01N 11/08
See application file for complete search history.

(56) References Cited

U.S. PATENT DOCUMENTS

| | | |
|---|---|---|
| 3,203,225 A | 8/1965 | Sieglaff et al. |
| 3,520,179 A | 7/1970 | Reed |

(Continued)

OTHER PUBLICATIONS

Gupta, Siddhartha, William S. Wang, and Siva A. Vanapalli. "Microfluidic viscometers for shear rheology of complex fluids and biofluids." Biomicrofluidics 10.4 (2016): 043402. (Year: 2016).*

(Continued)

*Primary Examiner* — Omar F Fernandez Rivas
*Assistant Examiner* — David A Hopkins
(74) *Attorney, Agent, or Firm* — Joseph Petrokaitis; Ryan, Mason & Lewis, LLP

(57) ABSTRACT

An apparatus to perform tests on fluid flow and configured to operate at field conditions includes one or more vessels and one or more sets of fluid injecting devices corresponding to respective ones of the one or more vessels. Each set of fluid injecting devices includes one or more fluid injecting devices each configured to inject a respective fluid through its respective vessel. The apparatus further includes one or more measurement devices operatively coupled to respective ones of the one or more vessels and configured to measure data associated with fluid flow of the one or more fluids injected into its respective vessel. The measured data comprises one or more of pressure gradient data and flow rate data. The apparatus is in communication with at least one processor configured to calculate a model based on the measured data. In calculating the model, the at least one processor is configured to infer one or more parameters for the model from the measured data.

19 Claims, 12 Drawing Sheets

(56) References Cited

U.S. PATENT DOCUMENTS

| | | | |
|---|---|---|---|
| 3,881,344 A | 5/1975 | Jobe | |
| 4,211,106 A | 7/1980 | Swanson | |
| 4,416,148 A | 11/1983 | Klus et al. | |
| 4,817,416 A | 4/1989 | Blanch et al. | |
| 5,172,585 A | 12/1992 | Gleissle | |
| 5,297,420 A | 3/1994 | Gilliland et al. | |
| 5,308,953 A | 5/1994 | Grudzien, Jr. et al. | |
| 5,347,851 A | 9/1994 | Grudzien, Jr. et al. | |
| 5,637,790 A | 6/1997 | de Corral | |
| 6,085,577 A | 7/2000 | Christensen et al. | |
| 6,152,181 A | 11/2000 | Wapner et al. | |
| 7,092,822 B2 | 8/2006 | Lenormand et al. | |
| 7,352,179 B2 | 4/2008 | Chen et al. | |
| 2003/0041652 A1* | 3/2003 | Spaid | B01L 3/502715 73/54.05 |
| 2003/0164027 A1 | 9/2003 | Terrom | |
| 2004/0074311 A1* | 4/2004 | Lull | G01F 1/696 73/861 |
| 2006/0165565 A1 | 7/2006 | Ermakov | |
| 2010/0054995 A1* | 3/2010 | Kwon | B82Y 30/00 422/68.1 |
| 2010/0064780 A1* | 3/2010 | Stone | G01L 7/187 73/61.78 |
| 2011/0210757 A1 | 9/2011 | Bismarck et al. | |
| 2012/0180894 A1 | 7/2012 | Sugahara | |
| 2014/0309951 A1* | 10/2014 | Alvarez Vallejos | G01N 11/08 702/47 |
| 2019/0006850 A1* | 1/2019 | Bistoni | H02J 3/00 |

OTHER PUBLICATIONS

Paenke, Ingo, Jürgen Branke, and Yaochu Jin. "Efficient search for robust solutions by means of evolutionary algorithms and fitness approximation." IEEE Transactions on Evolutionary Computation 10.4 (2006): 405-420. (Year: 2006).*

Bandalusena, HC Hemaka, William B. Zimmerman, and Julia M. Rees. "Creeping flow analysis of an integrated microfluidic device for rheometry." Journal of Non-Newtonian Fluid Mechanics 165. 19-20 (2010): 1302-1308. (Year: 2010).*

Cai, Jianchao, et al. "Generalized modeling of spontaneous imbibition based on Hagen-Poiseuille flow in tortuous capillaries with variably shaped apertures." Langmuir 30.18 (2014): 5142-5151. (Year: 2014).*

Aichholzer, Walter, and Hans-Gerhard Fritz. "Rheological characterization of thermoplastic starch materials." Starch-Stärke 50.2-3 (1998): 77-83. (Year: 1998).*

Agresti, Alan. Foundations of linear and generalized linear models. John Wiley & Sons, 2015. (Year: 2015).*

US Federal Register, vol. 58, No. 72, Apr. 16, 1993 (Year: 1993).*

Corner Canyon High School AP Biology, "Scientific Method: The Cricket Lab", Accessed at https://cornercanyonapbiology.weebly.com/uploads/1/7/0/7/17070906/scientific_method_-_ricket_lab.pdf (Year: 2007).*

Brown, Angus M. "A step-by-step guide to non-linear regression analysis of experimental data using a Microsoft Excel spreadsheet." Computer methods and programs in biomedicine 65.3 (2001): 191-200. (Year: 2001).*

Duffy, Daniel J., and Andrea Germani. C#for Financial Markets. vol. 405. Chichester: John Wiley & Sons, 2013. (Year: 2013).*

Dennis, Jr., John E., David M. Gay, and Roy E. Walsh. "An adaptive nonlinear least-squares algorithm." ACM Transactions on Mathematical Software (TOMS) 7.3 (1981): 348-368. (Year: 1981).*

Motulsky, Harvey, and Arthur Christopoulos. Fitting models to biological data using linear and nonlinear regression: a practical guide to curve fitting. Oxford University Press, 2004. (Year: 2004).*

Kemmer, Gerdi, and Sandro Keller. "Nonlinear least-squares data fitting in Excel spreadsheets." Nature protocols 5.2 (2010): 267. (Year: 2010).*

Motulsky, Harvey J., and Lennart A. Ransnas. "Fitting curves to data using nonlinear regression: a practical and nonmathematical review." The FASEB journal 1.5 (1987): 365-374. (Year: 1987).*

Guillot, Pierre, et al. "Viscosimeter on a microfluidic chip." Langmuir 22.14 (2006): 6438-6445. (Year: 2006).*

Kahouadji, Lyes, et al. "Simulation of immiscible liquid—liquid flows in complex microchannel geometries using a front-tracking scheme." Microfluidics and Nanofluidics 22.11 (2018): 126. (Year: 2018).*

Solomon, Deepak E., and Siva A. Vanapalli. "Multiplexed microfluidic viscometer for high-throughput complex fluid rheology." Microfluidics and nanofluidics 16.4 (2014): 677-690. (Year: 2014).*

Ramírez-Miquet, Evelio E., et al. "Optical feedback interferometry for velocity measurement of parallel liquid—liquid flows in a microchannel." Sensors 16.8 (2016): 1233. (Year: 2016).*

Fu, Xiaotong. A New Conductive Membrane-Based Microfluidic Platform for Electrokinetic Applications . Diss. Johns Hopkins University, 2017. (Year: 2017).*

Jung, Taekeon, and Sung Yang. "Highly stable liquid metal-based pressure sensor integrated with a microfluidic channel." Sensors 15.5 (2015): 11823-11835. (Year: 2015).*

Pan, Lichao. "Complex fluids in microchannel flows at low Reynolds number: Elastic instabilities and rheology." (2013). (Year: 2013).*

Demori, M., et al. "A microfluidic capacitance sensor for fluid discrimination and characterization." Sensors and Actuators A: Physical 172.1 (2011): 212-219. (Year: 2011).*

M.A. Ritter et al., "The Effects of Pulsed Fluid Irrigation on Bony Ingrowth in Porous Polyethylene Implants," Orthopedics, Feb./Mar. 1987, pp. 285-288, vol. 10, No. 2.

C. Cottin et al., "Drainage in Two-Dimensional Porous Media: From Capillary Fingering to Viscous Flow," Physical Review E: Statistical, Nonlinear and Soft Matter Physics, Oct. 28, 2010, 11 pages.

J. Beaumont et al., "Drainage in Two-Dimensional Porous Media with Polymer Solutions," Soft Matter, Nov. 2013, pp. 10174-10185, vol. 9, No. 42.

J.S. Ellis et al., "Dynamic Pore Network Model of Surface Heterogeneity in Brine-Filled Porous Media for Carbon Sequestration," Physical Chemistry Chemical Physics (PCCP), Jun. 21, 2012, pp. 8382-8390, vol. 14, No. 23.

R.T. Armstrong et al., "Interfacial Velocities and Capillary Pressure Gradients During Haines Jumps," Physical Review E: Statistical, Nonlinear and Soft Matter Physics, Oct. 22, 2013, 9 pages, vol. 88, No. 4.

S, Wang et al, "A Dynamic Pore-Scale Network Model for Two-Phase Imbibition," Journal of Natural Gas Science and Engineering, Jun. 1, 2015, pp. 118-129, vol. 26.

T.D. Blake et al., "The Influence of Solid-Liquid Interactions On Dynamic Wetting," Advances in Colloid and Interface Science, 2002, pp. 21-36.

W. Rose et al., "Moving Interfaces and Contact Angle Rate-Dependency," Journal of Colloid Science, Jan. 1962, pp. 39-48, vol. 17, No. 1.

M. Heshmati et al., "Experimental Investigation of Dynamic Contact Angle and Capillary Rise in Tubes with Circular and Noncircular Cross Sections," Langmuir, Dec. 2, 2014, pp. 14151-14162, vol. 30, No. 47.

M.R. Stukan et al., "Spontaneous Imbibition in Nanopores of Different Roughness and Wettability," Langmuir, Aug. 1, 2010, pp. 13342-13352, vol. 26, No. 16.

G. Martic et al., "A Molecular Dynamics Simulation of Capillary Imbibition," Langmuir, Oct. 15, 2002, pp. 7971-7976, vol. 18, No. 21.

S. Asadi, Simulation of Nanodroplet Impact on a Solid Surface, International Journal of Nano Dimension (IJND), Summer 2012, pp. 19-26, vol. 3, No. 1.

K.W. Oh et al., "A Review of Microvalves," Journal of Micromechanics and Microengineering, Mar. 24, 2006, pp. R13-R39, vol. 16, No. 5.

D. Erickson et al., "Smartphone Technology can be Transformative to the Deployment of Lab-On-Chip Diagnostics," Mar. 24, 2014, pp. 3159-3164, vol. 14, No. 17.

O. Mudanyali et al., "Integrated Rapid-Diagnostic-Test Reader Platform on a Cellphone," Lab Chip, Aug. 7, 2012, pp. 2678-2686, vol. 12, No. 15.

(56) References Cited

OTHER PUBLICATIONS

P. Marguet et al., "Biology by Design: Reduction and Synthesis of Cellular Components and Behaviour," Journal of the Royal Society Interface, Aug. 22, 2007, pp. 607-623, vol. 4, No. 15.
M. Radiom et al., "Capillary Filling with the Effect of Pneumatic Pressure of Trapped Air," Microfluidics and Nanofluidics, Jul. 2009, pp. 67-75, vol. 9.
L. Chen et al., "Convex Nanobending at a Moving Contact Line: The Missing Mesoscopic Link in Dynamic Wetting," ACS Nano, Oct. 22, 2014, pp. 11493-11498, vol. 8, No. 11.
Gebhard Schramm, "A Practical Approach to Rheology and Rheometry," Karsruhe (etc.): Haake, 1994, 291 pages.
H.A. Barnes et al., "An Introduction to Rheology," Elsevier Science, Rheology Series, Jun. 1, 1989, pp. 1-199, vol. 3.
S. Berry et al., "New Methods to Transport Fluids in Micro-Sized Devices," MIT, Lincoln Laboratory Journal, 2008, pp. 1-11, vol. 17, No. 2.
A.K. Au et al., "Microvalves and Micropumps for BioMEMS," Micromachines, May 24, 2011, pp. 179-220, vol. 2, No. 2.
C. Zhang et al., "Micropumps, Microvalves, and Micromixers Within PCR Microfluidic Chips: Advances and Trends," Biotechnology Advances, Sep.-Oct. 2007, pp. 483-514, vol. 25, No. 5.
H. Becker et al., "Integrated Lab-on-a-Chip," SPIE Newsroom, Biomedical Optics & Imaging, Feb. 22, 2011, 2 pages.
H. Lee et al., "Various On-Chip Sensors with Microfluidics for Biological Applications," Sep. 12, 2014, Sensors, Sep. 2014, pp. 17008-17036, vol. 14, No. 9.
R. Farra et al., "First-in-Human Testing of a Wirelessly Controlled Drug Delivery Microchip,"Science Translational Medicine, Feb. 22, 2012, 12 pages, vol. 4, No. 122.

\* cited by examiner

600

FLUID 1: GLICEROL || FLUID 2: AIR || FITTED MK PARAMETERS: {6183 0,0199} || CAPILLARY DIAMETER[m]: 1*10^-3 || SURFACE TENSION [N/m]: 0,06347 || STATIC CONTACT ANGLE [rad]: 0 || INLET PRESSURE [Pa]: 101325 || || T[k]=298.15 OUTLET PRESSURE [Pa]: 101325 || DENSITY FLUID 1 [kg/m^3]: 1260 || DENSITY FLUID 2 [kg/m^3]: 1 || VISCOSITY FLUID 1 [Pa.s]: 1,011 || VISCOSITY FLUID 2 [Pa.s]: 1,72*10^-5

FIG. 7B
700B

| C1 | GRUBBS' METHOD | CROSS VALIDATION |
|---|---|---|
| 6183 | 0,485509949 | 5998,25 |
| 4682 | 0,155431505 | 6373,5 |
| 100 | 2,1198963 | |
| 5880 | 0,356126031 | 6074 |
| 7327 | 0,974008966 | 5712,25 |
| 6104 | 0,451776188 | 6018 |
| SAMPLE MEAN | STANDARD DEVIATION | |
| 5046 | 2341,86756 | |
| CONFIDENCE LEVEL | 99% | 1,944 |
| | C1 | 6035,2 |

| C2 | GRUBBS' METHOD | CROSS VALIDATION |
|---|---|---|
| 0,0199 | 0,439394469 | 0,01843 |
| 0,0199 | 0,439394469 | 0,01843 |
| 0,4258 | 2,235724998 | |
| 0,01296 | 0,485133146 | 0,020165 |
| 0,02096 | 0,432408446 | 0,018165 |
| 0,0199 | 0,439394469 | 0,01843 |
| SAMPLE MEAN | STANDARD DEVIATION | |
| 0,08657 | 0,151731541 | |
| CONFIDENCE LEVEL | 99% | 1,944 |
| | C2 | 0,018724 |

SAMPLE MEAN $$\bar{X} = \frac{1}{N}\sum_{i=1}^{N} x_i$$

STANDARD DEVIATION $$S = \sqrt{\frac{1}{N}\sum_{i=1}^{N}(x_i - \bar{X})^2}$$

GRUBBS' TEST FOR OUTLIERS ** $G = \dfrac{x_i - \bar{X}}{S} < \alpha$

| VALUES OF GRUBBS STATISTICS (G) | | | | | | |
|---|---|---|---|---|---|---|
| NUMBER OF OBSERVATIONS | CONFIDENCE LEVEL (%) | | | | | |
| n | 99.9 | 99.5 | 99 | 97.5 | 95 | 90 |
| 6 | 2.011 | 1.973 | 1.944 | 1.887 | 1.822 | 1.729 |

FIG. 7C
700C
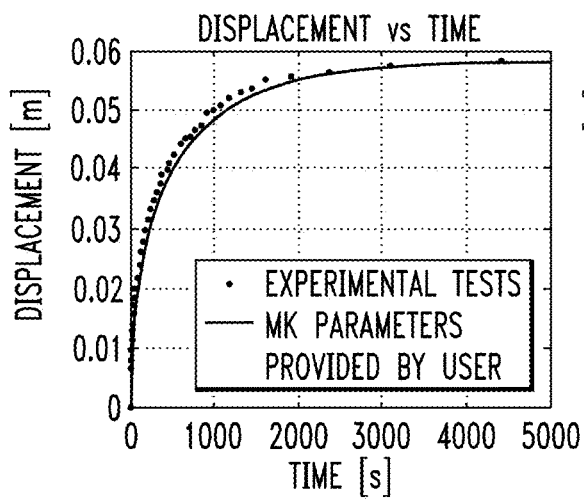
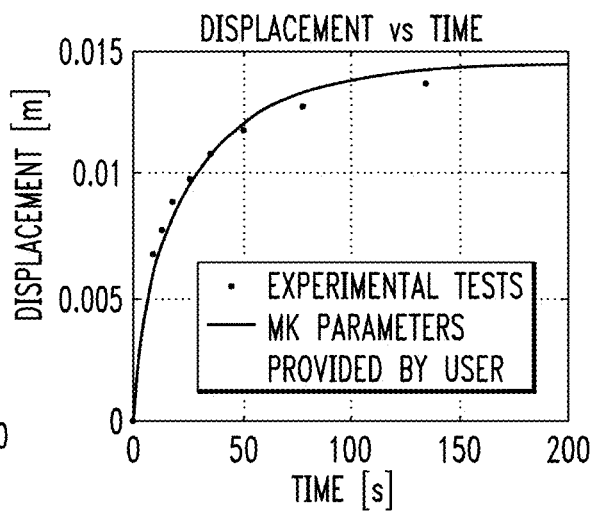
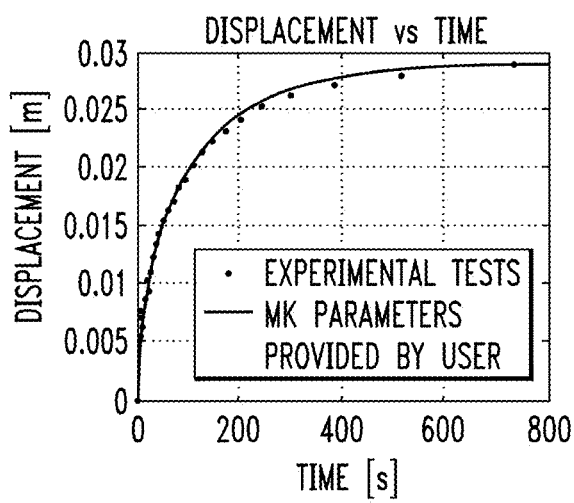
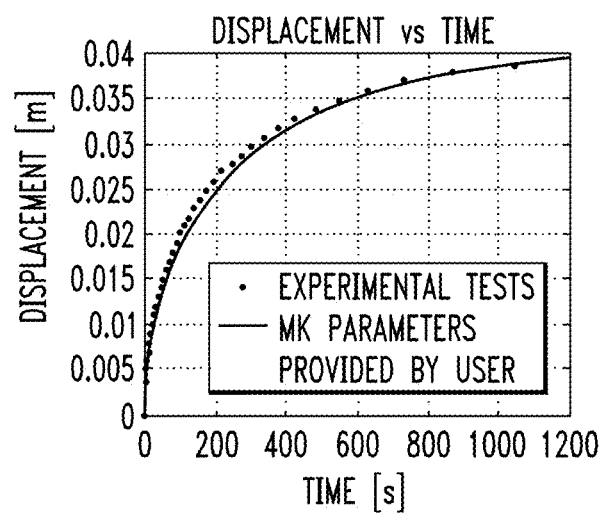

FIG. 7C cont.
700C
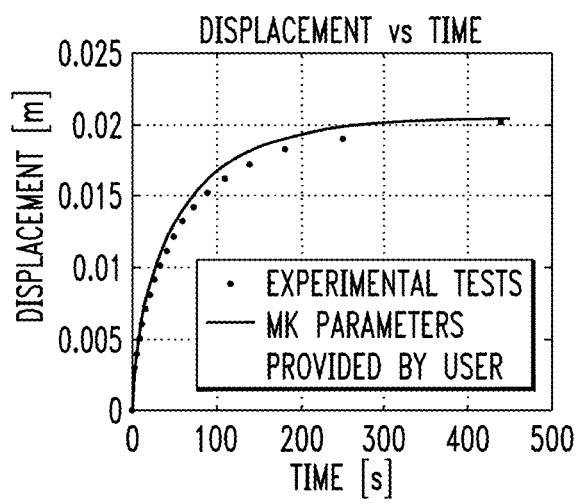
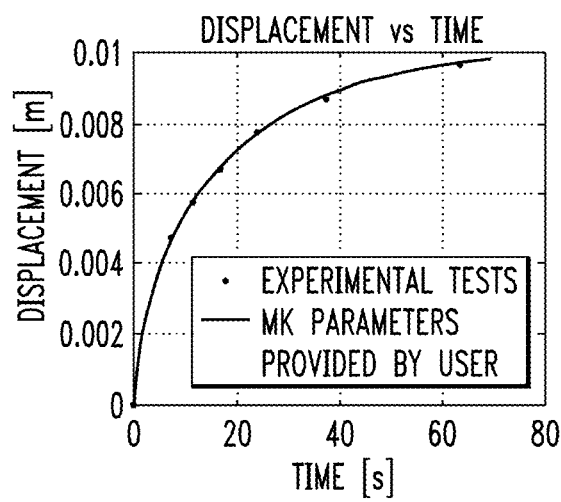
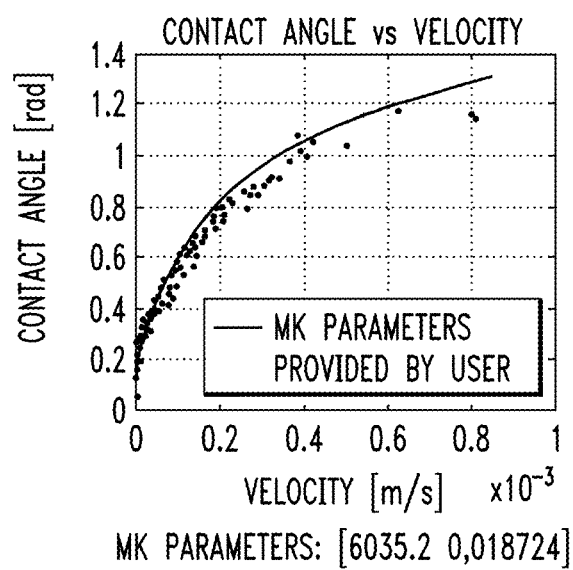

CHARACTERIZING FLUID FLOW AT FIELD CONDITIONS

BACKGROUND

Characterizing immiscible interface dynamics and the rheology of fluids flowing in vessels, such as capillaries, is of great interest for many industries. Unlike in larger vessels, capillary pressure dominates the flow dynamics in microcapillaries (i.e., capillaries having diameters on the scale of micrometers) and nano-capillaries (i.e., capillaries having diameters on the scale of nanometers). In capillary networks, viscous forces affect the pressure gradient, but the capillary pressure controls the dynamics of interfaces between fluids. Understanding and calibrating this phenomenon in fluid flow is important in order to increase efficiency and control of various industrial processes. For example, a correct characterization of the dynamics may affect the irrigation efficiency of organic liquids in biomaterials, may be needed to calculate the power required by a micropump in a micro-implant to supply medicines to users, or may be essential for the design of microchips (e.g., lab-on-a-chip) used in medical and biological tests.

SUMMARY

Embodiments provide techniques for characterizing fluid flow at field conditions.

In an embodiment, an apparatus to perform tests on fluid flow and configured to operate at field conditions comprises: one or more vessels; one or more sets of fluid injecting devices corresponding to respective ones of the one or more vessels, wherein each set of fluid injecting devices comprises one or more fluid injecting devices each configured to inject a respective fluid through its respective vessel; and one or more measurement devices operatively coupled to respective ones of the one or more vessels and configured to measure data associated with fluid flow of the one or more fluids injected into its respective vessel, wherein the measured data comprises one or more of pressure gradient data and flow rate data, and wherein the apparatus is in communication with at least one processor configured to calculate a model based on the measured data. In calculating the model, the at least one processor is configured to infer one or more parameters for the model from the measured data.

In another embodiment, a method comprises the following steps. Data associated with fluid flow of one or more fluids injected into one or more respective vessels is received. The received data comprises one or more of pressure gradient data and flow rate data. The received data is measured by an apparatus configured to operate at field conditions. A model is calculated based on the received data. Calculating the model comprises inferring one or more parameters for the model from the measured data. The steps are implemented via at least one processor operatively coupled to a memory.

In yet another embodiment, an article of manufacture for performing tests on fluid flow comprises a processor-readable storage medium for storing processor-readable program code which, when executed, causes a processor to implement the steps of: receiving data associated with fluid flow of one or more fluids injected into one or more respective vessels, with the received data comprising one or more of pressure gradient data and flow rate data and being measured by an apparatus configured to operate at field conditions; and calculating a model based on the received data, wherein calculating the model comprises inferring one or more parameters for the model from the measured data.

These and other exemplary embodiments of the invention will be described in or become apparent from the following detailed description of exemplary embodiments, which is to be read in connection with the accompanying drawings.

BRIEF DESCRIPTION OF THE DRAWINGS

FIGS. 7A-7C illustrate a use case implementing the processes described in FIGS. 4-6.

DETAILED DESCRIPTION

Illustrative embodiments will be described below for finding properties of fluids flowing in vessels and characterizing fluid interfaces and fluid flow through the vessels, including general and realistic models for interface dynamics. The illustrative embodiments provide techniques for characterizing the dynamics of immiscible interfaces and the rheology of the fluids that make it up without requiring interface geometry or additional equipment to measure fluid characteristics. The techniques may be easily applied at field conditions and/or in industrial settings, and the configuration of the apparatus may easily be changed to represent a specific application. While illustrative techniques described herein are particularly well-suited for characterizing fluids flowing in capillary-type vessels at field conditions, it is to be understood that embodiments are not intended to be limited to flow through capillaries.

As used herein, the term "field conditions" refers to actual use conditions, as opposed to controlled conditions such as laboratory conditions. Actual use conditions may include high temperature and/or high pressure conditions, and may further refer to the use of a testing apparatus constructed from materials found in the field.

Figure 1:
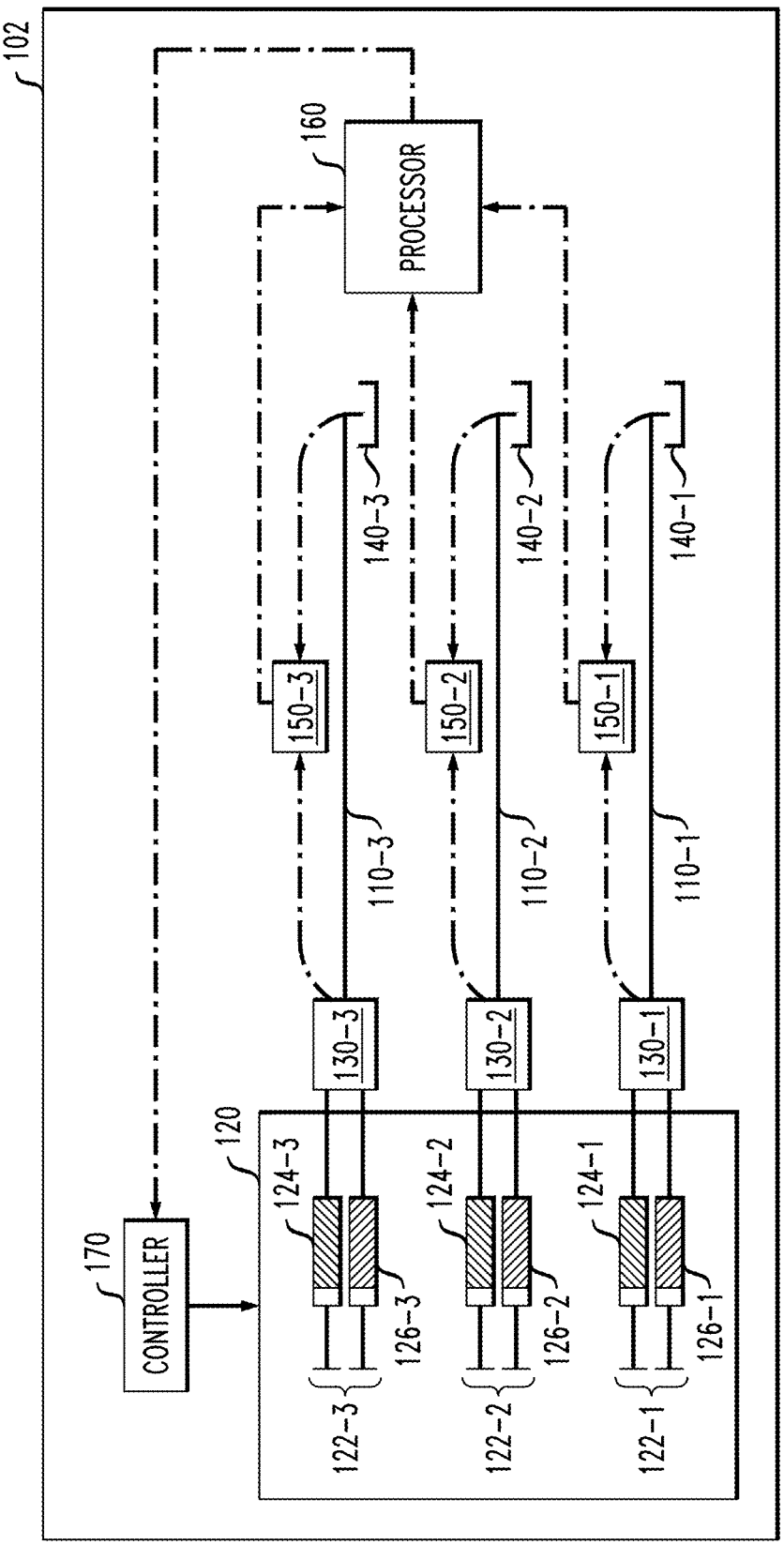
FIG. 1 illustrates a block diagram of an apparatus for the acquisition of experimental data, according to an embodiment of the invention.

FIG. 1 illustrates a block diagram of a system 100 configured to characterize immiscible interface dynamics and the rheology of fluid flow through vessels at field conditions. The system 100 comprises an apparatus 102 for the acquisition of experimental information regarding fluid flow. The apparatus 102 may be configured to represent specific applications in a range of domains. In one embodiment, the apparatus 102 comprises a rheometer configured to collect data associated with fluid flow. For example, the apparatus 102 may comprise a multiphase capillary rheometer. As will be discussed in further detail, the apparatus 102 may be configured to perform a varied sample of experimental tests to calculate the rheology, or fluid properties, and parameters of the flow of fluid through vessels.

As shown in FIG. 1, apparatus 102 comprises vessels 110-1, 110-2 and 110-3. Although three vessels are shown in FIG. 1, any number of vessels may be implemented in apparatus 102, in accordance with the embodiments described herein.

In one embodiment, one or more of vessels 110-1, 110-2 and 110-3 comprise one or more capillaries. The one or more capillaries may run substantially in parallel. The one or more capillaries may be manufactured from any material suitable for an application of interest, and may vary across dimension (e.g., length and diameter) depending on the application of interest. Various applications of interest may include, for example, biomedical and biological, microtechnology and microdevices, lab-on-a-chip, oil and gas and printers. One skilled in the art would be able to identify the capillary material and dimensions that may be optimal for performing experimental tests on fluid flow with respect to the particular application of interest.

In another embodiment, one or more of vessels 110-1, 110-2 and 110-3 may be comprised of one or more flexible channels or tubes. The flexible tubes may vary in material, flexibility, diameter, length, etc. This flexible tube embodiment may be particularly advantageous for use in the healthcare industry in order to approximate fluid flow through biomaterials.

In yet another embodiment, one or more of vessels 110-1, 110-2 and 110-3 may be implemented with one or more manufactured channels. The one or more manufactured channels may include curved pathways, or otherwise non-straight pathways, and may be constructed with or without patterned surfaces. Thus, the one or more manufactured channels may be designed to represent the effects of tortuosity and/or surface roughness. Additionally, the manufactured channels may vary in surface type (e.g., wettable or not wettable to fluids). Single channels with variable cross sections may also be used. This manufactured channel embodiment may be particularly advantageous for use in the petroleum industry, since such channels may be manufactured in actual rock in order to more closely match field conditions.

In yet another alternative embodiment, one or more of vessels 110-1, 110-2 and 110-3 may be implemented with one or more variable cross section devices to calibrate and analyze hydraulic devices in special conditions. Examples of hydraulic devices include valves, orifice plates, Venturi tubes, flow rate meters, density meters, actuators, etc. This variable cross section device embodiment may be particularly advantageous for manufacturers of hydraulic devices used in industries such as automobile, aviation, robotics, construction, research, etc. For instance, hydraulic devices such as high-pressure valves or orifice plates with strong shear rate variations may be difficult to simulate and characterize without the ability to perform experimental tests provided by this embodiment.

As shown in the illustrative embodiment of FIG. 1, apparatus 102 comprises fluid injecting component 120 comprising sets of fluid injecting devices 120-1, 120-2 and 120-3. Sets of fluid injecting devices 122-1, 122-2 and 122-3 correspond to vessels 110-1, 110-2 and 110-3, respectively.

Although three sets of fluid injecting devices are shown in FIG. 1, any number of sets of fluid injecting devices may be implemented in apparatus 102, in accordance with the embodiments described herein.

Set of fluid injecting devices 122-1 is shown comprising fluid injecting devices 124-1 and 126-1, set of fluid injecting devices 122-2 is shown comprising fluid injecting devices 124-2 and 126-2, and set of fluid injecting devices 122-3 is shown comprising fluid injecting devices 124-3 and 126-3. Although each set of fluid injecting devices is shown having two fluid injecting devices in FIG. 1, any number of fluid injecting devices may be implemented in each set of fluid injecting devices 122-1 through 122-3, in accordance with the embodiments described herein. Additionally, it is to be understood and appreciated that each set of fluid injecting devices may have the same number of fluid injecting devices, or the number of fluid injecting devices may vary between each set of fluid injecting devices.

Each fluid injecting device is configured to inject a fluid through its respective vessel. Moreover, each of the fluid injecting devices within a set of fluid injecting devices may be configured to inject the same fluid through its respective vessel, or may be configured to inject different fluids through its respective vessel.

In one embodiment, one or more of the fluid injecting devices in a set of fluid injecting devices, such as at least one of fluid injecting devices 124-1 and 126-1 of set of fluid injecting devices 122-1, comprise one or more syringes. In this embodiment, the one or more fluid injecting devices in the set of fluid injecting devices may further comprise one or more syringe pumps operatively coupled to respective ones of the one or more syringes. Each syringe pump may be configured to control a rate of flow of the one or more fluids in the one or more syringes into its respective vessel. For example, the syringe pump of fluid injecting devices 124-1 and 126-1 may be configured to control the rate of flow of fluids into vessel 110-1.

The apparatus may comprise one or more directional control valves operatively coupled to respective ones of the one or more sets of fluid injecting devices and inlets of respective ones of the one or more vessels. For example, as shown in the illustrative embodiment of FIG. 1, apparatus 102 comprises directional control valves 130-1, 130-2 and 130-3 operatively coupled to sets of fluid injecting devices 122-1, 122-2 and 122-3, respectively, as well as inlets of vessel 110-1, 110-2 and 110-3, respectively. As is known in the art, a directional control valve allows fluid flow into different paths from one or more sources. The directional control valve may restrict or allow fluid flow in order to control the fluid flow.

The apparatus comprises one or more reservoirs positioned beneath or after outlets of respective ones of the one or more vessels. For example, as shown in FIG. 1, apparatus 102 comprises reservoirs 140-1, 140-2 and 140-3 positioned beneath or after the outlets of vessels 110-1, 110-2 and 110-3, respectively.

The apparatus comprises one or more measurement devices operatively coupled to respective ones of the one or more vessels and configured to measure data associated with fluid flow of the one or more fluids injected into its respective vessel. For example, as shown in FIG. 1, apparatus 102 comprises measurement devices 150-1, 150-2 and 150-3 operatively coupled to vessels 110-1, 110-2 and 110-3, respectively. Measurement device 150-1 is configured to measure data associated with fluid flow of the fluids injected by fluid injecting devices 124-1 and 126-1, measurement device 150-2 is configured to measure data associated with fluid flow of the fluids injected by fluid injecting devices 124-2 and 126-2, and measurement device 150-3 is configured to measure data associated with fluid flow of the fluids injected by fluid injecting devices 124-3 and 126-3.

The measured data may comprise one or more of pressure gradient data and flow rate data. The pressure gradient data may be obtained by measuring pressure gradients between the inlets of respective vessels and the outlets of respective vessels. The pressure gradient may be also be used to detect when fluid interfaces enter and leave a vessel. The flow rate data is associated with flow rates of the fluids injected in their respective vessels.

In one embodiment, the one or more measurement devices comprise one or more pressure transducers operatively coupled to at least one of the one or more vessels. As used herein, a pressure transducer is a device that converts pressure measurements into electrical signals.

In an alternative embodiment, the one or more measurement devices may be implemented as piezoelectric devices embedded within at least one of the one or more vessels. These piezoelectric devices may be embodied as diaphragms coated with piezoelectric material. A piezoelectric material is a material that generates a voltage when subject to a mechanical stress or vibration, such as a mechanical stress or vibration caused by pressure.

Figure 2:
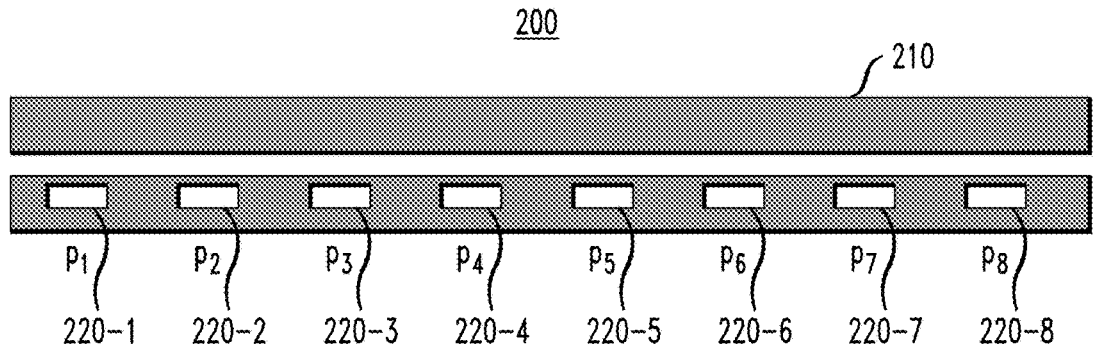
FIG. 2 illustrates a block diagram of a vessel comprising a plurality of piezoelectric diaphragms, according to an embodiment of the invention.

FIG. 2 depicts an exemplary vessel 210 comprising a plurality of piezoelectric devices, including piezoelectric devices 220-1 through 220-8. Although eight piezoelectric devices are shown embedded in the vessel of FIG. 2, any number of piezoelectric devices may be implemented in a vessel, in accordance with the embodiments described herein.

Piezoelectric devices 220-1 through 220-8 are configured to provide local pressure readings. For example, pressure dependent deflection of the piezoelectric material of piezoelectric devices 220-1 through 220-8 may induce a measurable voltage proportional to the local static pressure. Although piezoelectric devices may be embedded within any type of vessel, this embodiment is particularly advantageous for implementation with respect to fluid flow through small-scale capillaries, such as micro-capillaries and nano-capillaries. For example, this embodiment may be particularly advantageous for use in the petroleum and electronics industries, where length scales of significant fluid phenomena are diminishing.

Referring back to FIG. 1, system 100 is further shown including at least one processor 160. In the illustrative embodiment of FIG. 1, processor 160 is a component of apparatus 102. However, in other embodiments, processor 160 may be comprised in a separate processing device (not shown) external to apparatus 102. Processor 160 communicates with the one or more measurement devices to perform post-processing on the measured data.

System 100 is further shown including a pump controller, depicted as controller 170. In the illustrative embodiment of FIG. 1, controller 170 is a component of apparatus 102. However, in an alternative embodiment, controller 170 may be comprised in an external device (not shown) in communication with apparatus 102. Controller 170 is configured to communicate with processor 160 to automate the experimental routines to collect data. For example, in the case that a fluid injecting device comprises a syringe operatively coupled to a syringe pump, controller 170 may be configured to autonomously control the flow rate of the fluids through a vessel by automating the operation of the syringe pumps. Thus, the flow rate data may be obtained based on the flow rate controlled by controller 170.

In performing the post-processing, processor 160 is configured to calculate a model used to characterize the dynamics of the fluids flowing in the vessels. In one embodiment, the model is a characteristic dynamical model calculated based on one or more parameters inferred from the measured data. The one or more parameters may include one or more of rheological parameters and flow parameters, although other types of parameters may be inferred. The model may also take various fluid dynamic concerns into consideration, including but not limited to hydrostatic pressure, capillary pressure, kinetic energy, inertia, viscous forces, magnetic forces in ferromagnetic fluids, and electrowetting.

The parameters may be chosen based on relationships between various measurements. For example, parameters may be chosen based on a relationship between a contact angle of a fluid-fluid interface ("interface") and a velocity/speed of motion of the interface (referred to herein as "speed"). Parameters may be chosen based on a relationship between displacement or position of the interface an elapsed time of fluid flow. Each of these relationships may be visualized via graphs of contact angle versus speed and/or displacement versus time.

Figure 3:
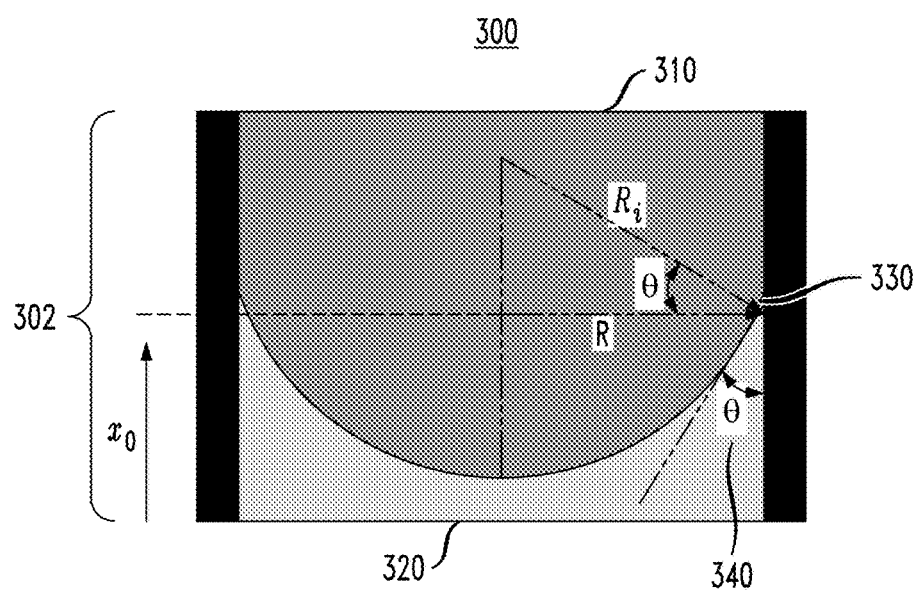
FIG. 3 illustrates a diagram of an exemplary fluid-fluid interface.

FIG. 3 provides a diagram 300 illustrating an exemplary fluid-fluid interface. As shown, diagram 300 corresponds to fluids 310 and 320 flowing through a portion of a vessel 302. The speed or velocity of the fluid flow may be determined by observing the change in position of the fluid flow over time and applying known kinematic techniques. Fluids 310 and 320 form a fluid-fluid interface at interface 330, which corresponds to displacement or position $X_0$. As shown, contact angle 340 of interface 330, denoted by θ, is the same as an angle of the right triangle defined by lengths R and $R_i$. Techniques known in the art may be used to determine lengths R and $R_i$ and contact angle 340 at a given velocity or speed based on lengths R and $R_i$.

Referring back to FIG. 1, one may conventionally determine the model parameters via direct means. For example, the contact angle and the speed measurements that may be used to determine the parameters may be obtained in the field by directly inspecting the interface as it is moving, and the parameters may subsequently be determined based on the relationship derived therefrom. However, illustrative embodiments of system 100 are capable of inferring the contact angle and the speed measurements indirectly from the measured data. In one embodiment, the interface speed and/or position may be measured as a function of time by utilizing the one or more measurement devices. Additionally, the relationship between the contact angle and the speed may be difficult or impossible to capture for small channels, where a microscope would be required. However, if a piezoelectric device is used as a measurement device, the speed of the motion of the interface may be measured as a function of time by detecting, via electrical current jump, whenever the interface passes the piezoelectric device.

The calculation of rheological parameters using information from experimental tests is a classic inverse problem, for which the causes of a phenomenon are determined from the consequences or effects. The optimization method may be affected by lost information or noise in measurements that may affect the results. Since the parameters are being inferred indirectly from the measured data, plugging the same fit parameters into the model would likely not provide a good fit. As solution to this problem, processor 160 may utilize an optimization methodology that enables the calculation of the parameters of the model. In order to optimize the fit for the parameters, processor 160 may be configured to fit the same model for a variety of tests, such as by iterating over various combinations of channel diameters and tilt angles. Thus, in one embodiment, processor 160 is further configured to generalize the model for one or more conditions using a statistical method. The statistical method may allow for the determination of a generalized model to describe the phenomenon in a wide range of operational and rheological conditions, and may aid in reconstructing lost information and reducing information noise.

Further details regarding the processes implemented by processor 160 with respect to calculating and generalizing the model are discussed below with reference to FIGS. 4-6.

The apparatus described in FIG. 1 may be used to measure the pressure gradient and flow rate of injected fluids. The apparatus may perform various experimental routines or tests in order to collect data of interest, such as the rheology and capillary-related parameters of the fluid flow, in order to infer the parameters defining a model (e.g., displacement and time, contact angle and speed). Experimental tests of one phase, or multiple phases, flowing in the vessels may be necessary to obtain the desired information. As mentioned, the apparatus may be advantageously utilized in field conditions, and may be configured to represent specific applications in a range of domains.

Moreover, a conventional apparatus for measuring rheological parameters in fluids (e.g., rheometers) may work only for specific cases, such as Newtonian fluids or linear viscoplastic fluids, such as Bingham fluids, and may only work with one phase flowing through the apparatus. In contrast, the embodiments described herein allow for the calculation of pressure of fluid flow vessels as a function of fluid-fluid interface velocity. Illustrative embodiments described herein calculate model parameters indirectly, such that it is not necessary to know geometrical or velocity information from the interface itself. Illustrative embodiments described herein may be applied in a wide range of operational conditions, such as in Stokes and laminar flow regimes, Newtonian and viscoplastic fluids, one or more immiscible phases, etc. Moreover, the embodiments described herein may measure the rheology of Newtonian and viscoplastic fluids, including viscoplastic fluids with a non-linear behavior (e.g., Herschel-Bulkley fluids), as well as measure the pressure for more than one immiscible phase.

In addition, conventional arrangements generally require specific information from an interface in order to calculate pressure of fluid flow in vessels. For this reason, the domains of applicability of these methods are limited to few industrial applications. In contrast to these conventional arrangements, illustrative embodiments described herein advantageously do not require such specific information from an interface in order to calculate fluid flow parameters. Thus, since the measurements obtained for fluid flowing in the vessels (e.g., pressure gradient and injection flow rate) may be used to infer these parameters, vessels may be constructed out of materials found in the field.

Figure 4:
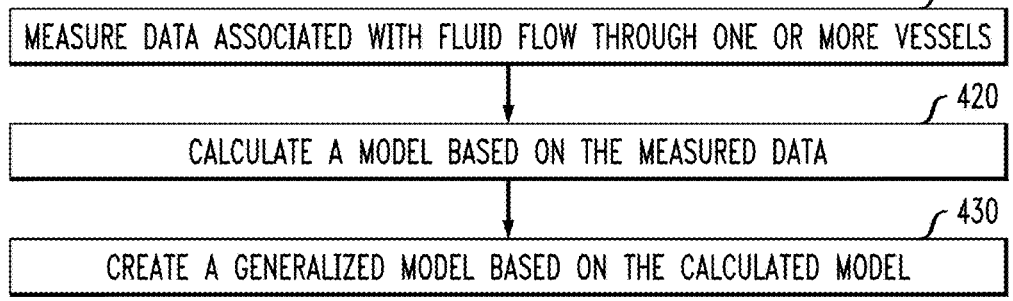
FIG. 4 illustrates an overview of a process for analyzing fluid flow according to an embodiment of the invention.

FIG. 4 illustrates a flowchart 400 of an overview of an exemplary process for analyzing fluid flow.

At step 410, data associated with fluid flow through one or more vessels is measured. In one embodiment, the measured data comprises a pressure gradient established between an inlet of and an outlet of each vessel, and a flow rate of the fluid flowing in each vessel. Further details regarding the implementation of step 410 are provided above in FIGS. 1 and 2.

At step 420, a model is calculated based on the measured data. In one embodiment, calculating the model comprises inferring one or more parameters for the model from the measured data. Further details regarding the implementation of step 420 are provided above in FIG. 1 and provided below in FIG. 5.

At step 430, a generalized model may (optionally) be created. In one embodiment, the generalized model is created for one or more conditions. Further details regarding the implementation of step 430 are provided above in FIG. 1 and provided below in FIG. 6.

Figure 5:
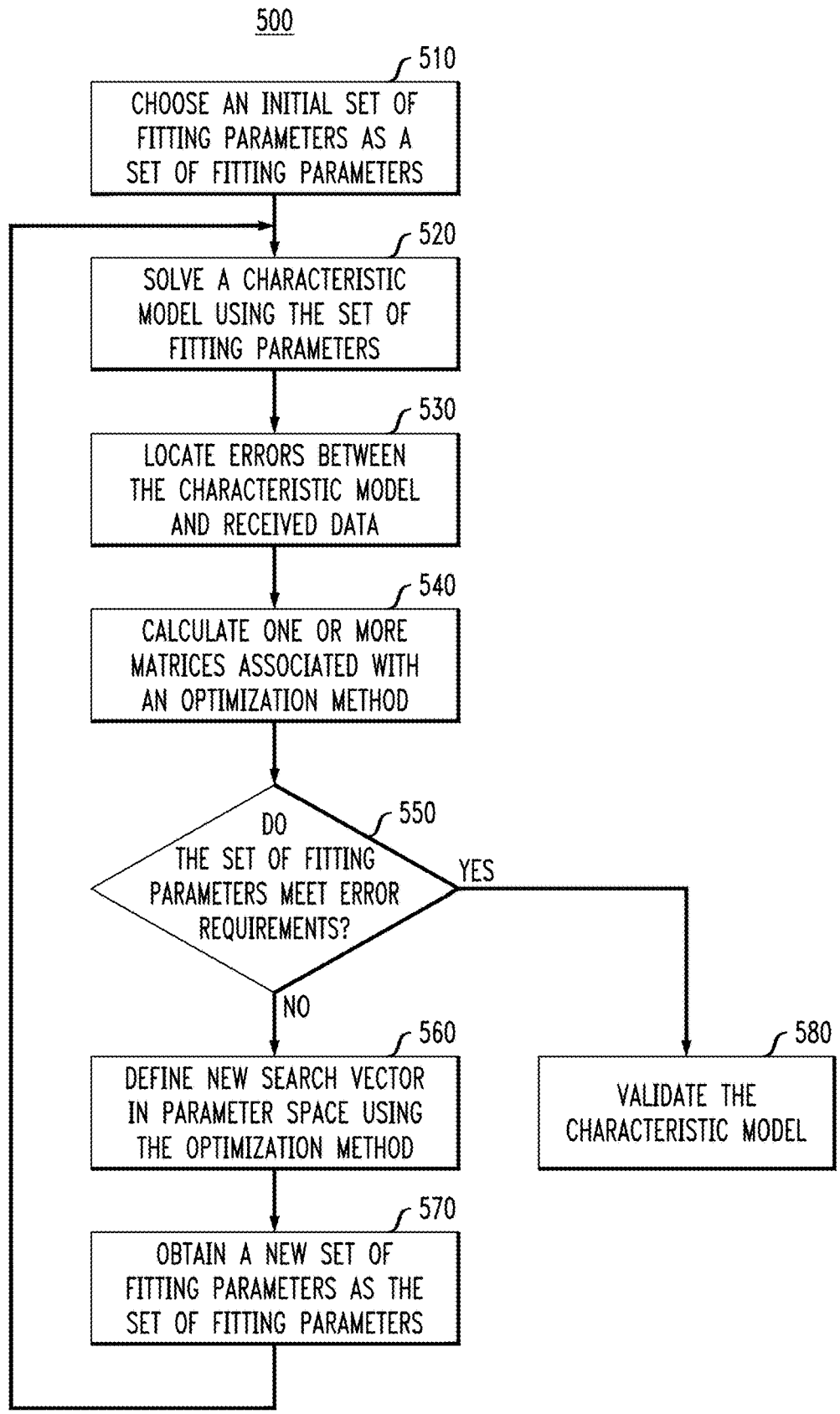
FIG. 5 illustrates a process for calculating a model based on data associated with fluid flow, according to an embodiment of the invention.

FIG. 5 illustrates a flowchart 500 of an exemplary process for calculating a model of fluid flow.

At step 510, an initial set of fitting parameters are chosen as a set of fitting parameters.

At step 520, a characteristic model is solved using the set of fitting parameters.

At step 530, errors between the characteristic model and received data are located. The received data may comprise experimental test results used to validate the optimization method. In one embodiment, a least-squares method is used to locate the errors at step 530. The experiment test results may be obtained from an apparatus, such as the apparatus discussed above in FIG. 1.

At step 540, one or more matrices associated with an optimization method are calculated. In one embodiment, calculating the one or more matrices comprises applying a finite differences method to calculate the Hessian matrix and the gradient matrix of the optimization method.

At step 550, it is determined if the set of fitting parameters meet the error requirements. In one embodiment, determining if the fitting parameters meet the error requirements comprises defining a set of stopping conditions to select the fitting parameter set with minimum error.

A negative response to the determination at step 550 results in defining a new search vector in parameter space using the optimization method at step 560. A new set of fitting parameters is then obtained as the set of fitting parameters at step 570, and the process reverts back to step 520 to re-solve the characteristic model using the new set of fitting parameters. Once the set of fitting parameters is determined to meet the error requirements, the characteristic model is validated at step 580.

The optimization methodology illustrated in FIG. 5 enables rapid calculation of parameters of a characteristic model that may be used to characterize the dynamics of immiscible fluids in capillaries.

As discussed in FIG. 1, the calculation of rheological parameters using information from experimental tests is a classic inverse problem, for which the causes of a phenomenon are determined from the consequences or effects. The optimization method may be affected by lost information or noise in measurements that may affect the results. Since the parameters are being inferred indirectly, plugging the same fit parameters into the model would likely not provide a good fit. As solution to this problem, processor 160 may utilize an optimization methodology that enables the calculation of the parameters of the model. In order to optimize the fit for the parameters, processor 160 may be configured to fit the same model for a variety of tests, such as by iterating over varying channel diameter and tilt angle combinations. Thus, in one embodiment, processor 160 is further configured to generalize the model for one or more conditions using a statistical method. The statistical method may aid in reconstructing lost information and reducing information noise, and may allow for the determination of a generalized model to describe the phenomenon in a wide range of operational and rheological conditions.

Figure 6:
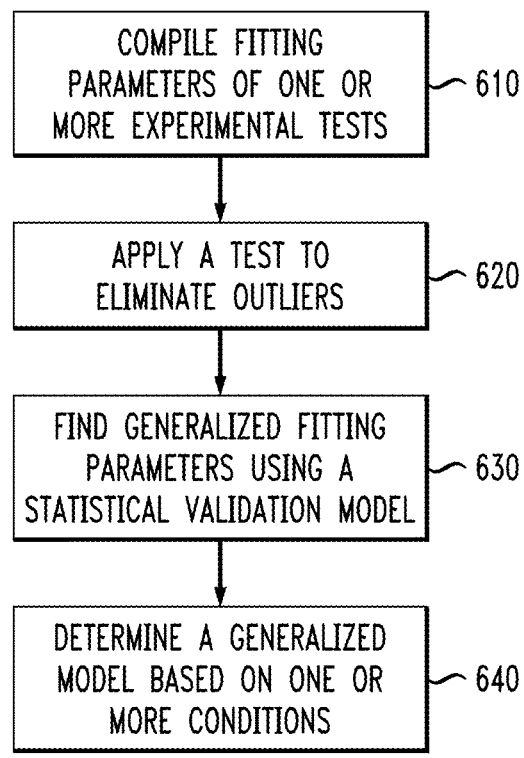
FIG. 6 illustrates a process for generalizing a model calculated based on data associated with fluid flow for one or more conditions associated with fluid flow, according to an embodiment of the invention.

FIG. 6 illustrates a flowchart 600 of an exemplary process for creating a generalized model of fluid flow based on a calculated model, such as the characteristic model determined by the process of FIG. 5.

At step 610, fitting parameters of all experimental tests performed are compiled. The experimental tests may be performed by the apparatus described above in FIG. 1.

At step 620, one or more tests are applied to eliminate outliers from the compiled fitting parameters. The one or more tests may comprise one or more of a Grubbs' Test, a Tietjen-Moore Test, and a Generalized Extreme Studentized Deviate (ESD) Test. However, any test or combination of tests known in the art that may be applied to eliminate outliers may be implemented, in accordance with the embodiments described herein.

At step 630, generalized fitting parameters are found using one or more statistical validation models. The one or more statistical validation models may comprise one or more of the Newton-Rhapson Method, the Quasi-Newton Method, the Davidon-Fletcher-Powell Method and the Broyden-Fletcher-Goldfarb-Shanno Method. However, any statistic validation model known in the art that may be used to find generalized fitting parameters may be implemented, in accordance with the embodiments described herein.

At step 640, the generalized model is determined based on one or more conditions of all of the experimental tests. In one embodiment, the one or more conditions comprise at least one of a rheological condition and an operational condition. Examples of rheological conditions may include, but are not limited to, viscosity changes based on changes in temperature, pressure changes, or changes in the concentrations of additives. Examples of operational conditions may include, but are not limited to, variations in channel sizes, roughness levels, and vessel orientations.

The model may be calibrated with information from different sources, such as Molecular Dynamics (MD) simulations, Computational Fluid Dynamics (CFD) simulations or experimental tests with transparent or non-transparent vessels.

Illustrative embodiments described herein may allow for the construction of testing apparatuses comprising vessels of the same material as those materials found in the field or in practical applications. These vessels can also be constructed of sturdy materials in order to withstand high temperatures and pressures (i.e., field conditions). In contrast, conventional methods for characterizing immiscible interfaces and complex fluids suffer from several disadvantages.

For example, such conventional testing apparatuses require direct visual inspection of the fluid interface position, or even measurement of the interface geometry. At small scales or in non-transparent vessels, such as vessels constructed of rock, various tubing, etc., the performance of such measurements utilizing conventional testing apparatuses may not be practical or even possible. Additionally, conventional testing apparatuses may suffer disadvantages in that they may require additional equipment to perform measurements, such as rotational rheometers or tensiometers. Conventional testing apparatuses are additionally problematic in that they require measurements that are difficult to obtain in industrial settings, and do not allow testing at field conditions. Thus, conventional methods of post-processing and analyzing results from experimental tests obtained from conventional testing apparatuses typically implement models that ignore or greatly simplify important dynamic phenomena. Illustrative embodiments allow for the indirect inference of measurements in the determination of model parameters, thereby overcoming the disadvantages of convention testing apparatuses. Accordingly, in contrast to conventional arrangements, illustrative embodiments described herein are advantageously configured to perform experimental tests of fluid flow at field conditions, such as industrial settings.

Figure 7A:
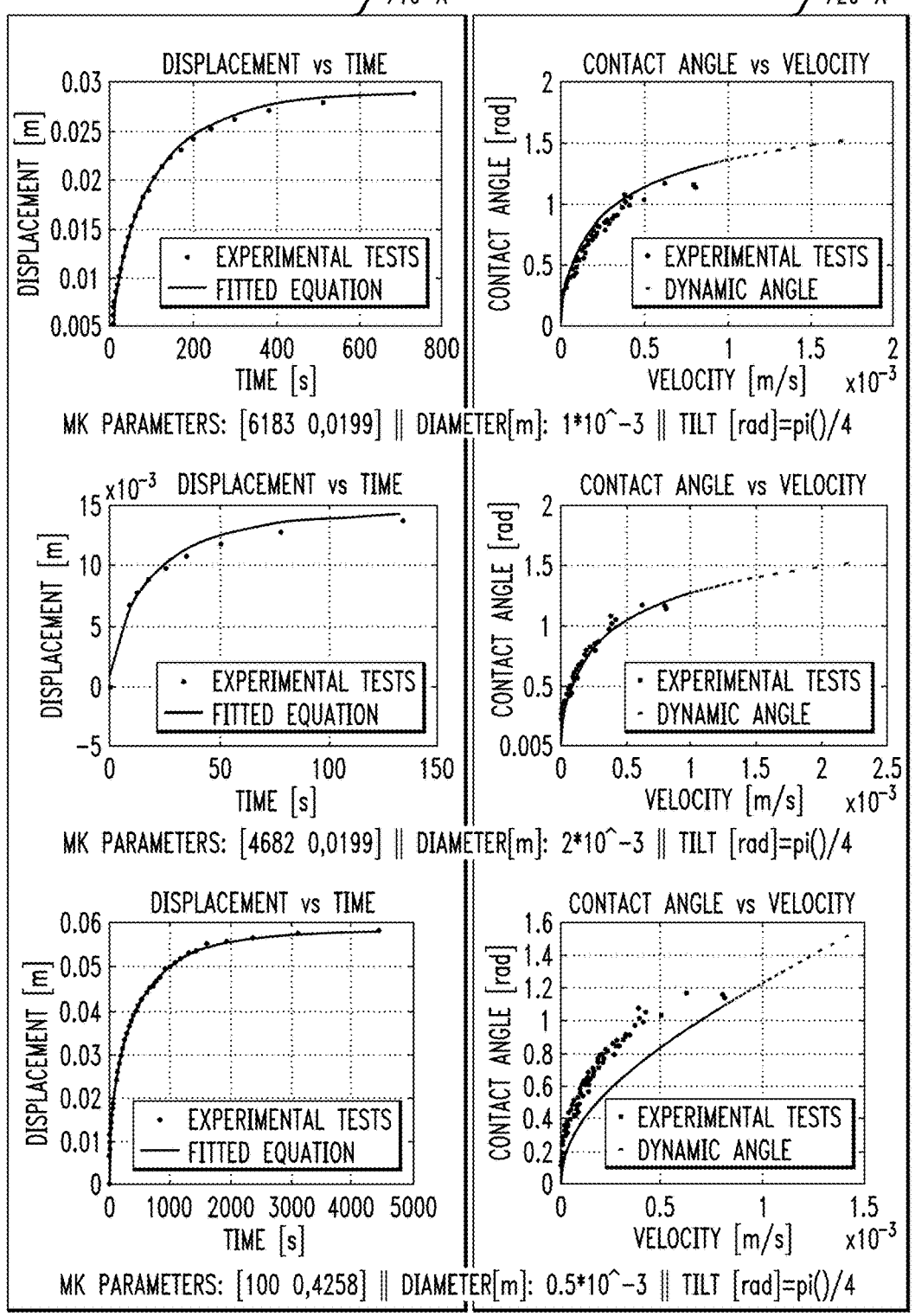
Figure 7A:
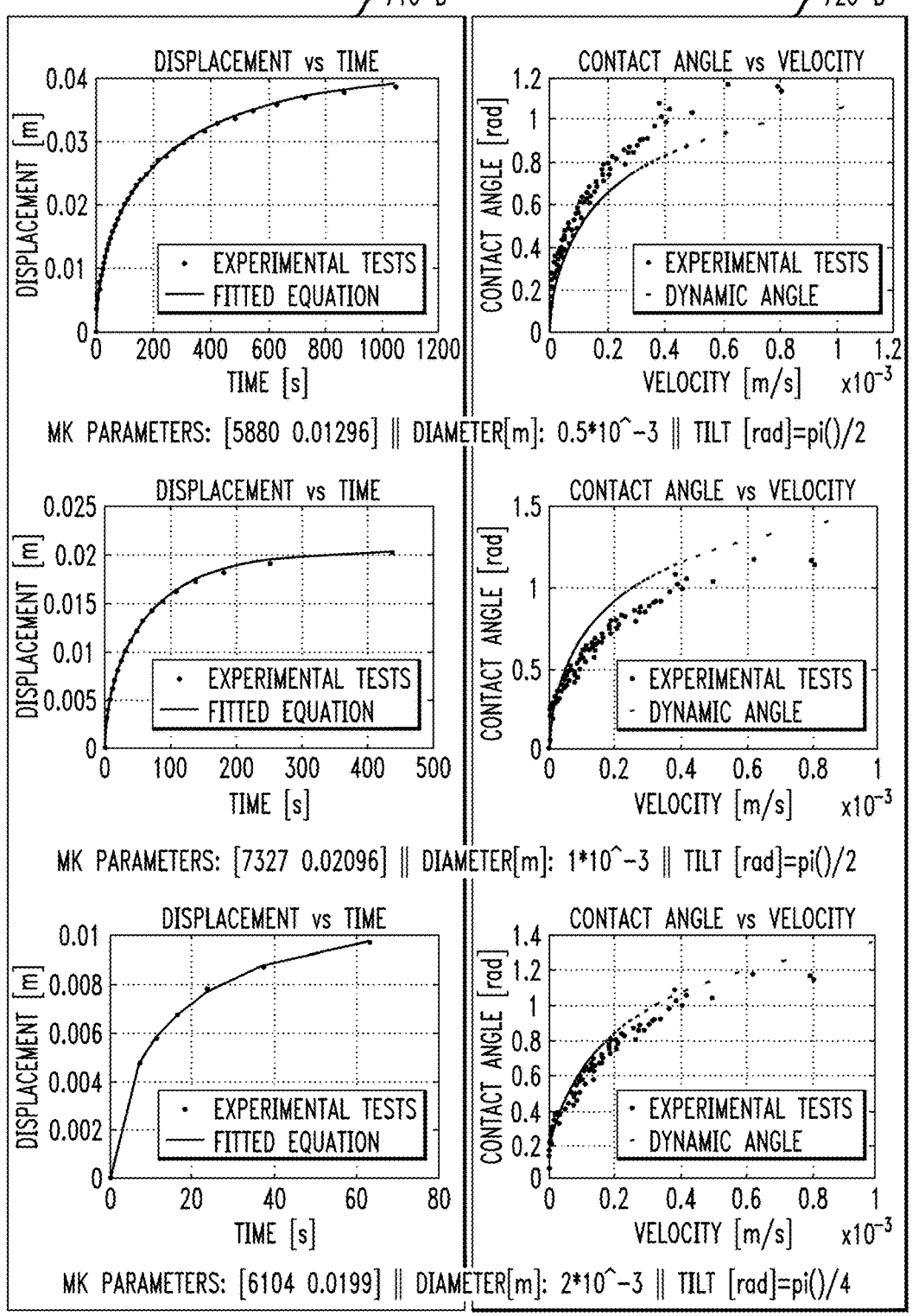

FIGS. 7A-7C illustrate an exemplary use case in which the model that is used is based on the contact angle of the fluid-fluid interface as a function of speed of the interface's motion. The plots and calculations described in this use case are based on data points obtained from M. Heshmati and M. Piri, "Experimental Investigation of Dynamic Contact Angle and Capillary Rise in Tubes with Circular and Noncircular Cross Sections," *Langmuir* 30.47: 14151-4162, November 2014, which is incorporated by reference herein in its entirety. These data points were used as a series of data to which fits were found. Accordingly, the calculations and fits demonstrated in FIGS. 7A-7C were determined by implementing an illustrative embodiment of the present invention.

With reference to FIG. 7A, plots 700A are provided representing iterations of model calculation over varying channel diameters and tilt angles.

Set of plots 710-A and set of plots 710-B each comprise plots associated with experimental tests performed to measure displacement versus time data. Each plot depicts the experimental test data as points on the plot, as well as a fitted equation determined from the points. Additionally, each plot has different parameters, channel diameters and tilt angles.

Set of plots 720-A and set of plots 720-B each comprise plots showing the results for contact angle and speed corresponding to the parameters found in the set of plots 710-A and 710-B, respectively.

It may be important to apply a statistical treatment to these results since some information may be lost for different reasons. For example, information may be lost due to roughness, viscous forces, quality of the measurements taken, etc. Another problem is that the solution of the inverse problem is a solution for the specific case solved, and it may be important to get a global solution. With the statistical treatment, it is possible to get the global solution.

As shown in FIG. 7B, a statistical treatment 700B may be applied to the results from FIG. 7A choose the best fit for all of the curve. Using statistical treatment 700B, parameters C1 and C2 were determined to be the best two parameters for all of the tests. In this illustrative example, C1 equals 6035.2, and C2 equals 0.018724. Although parameters C1 and C2 define the model for contact angle and speed, they were inferred from the series of tests measuring interface displacement and time. FIG. 7C depicts plots 700C that include six displacement versus time plots and one contact angle versus velocity plot that illustrate fits using parameters C1 and C2. As can be seen, parameters C1 and C2 work well for matching all of the experimental test data.

Figure 8:
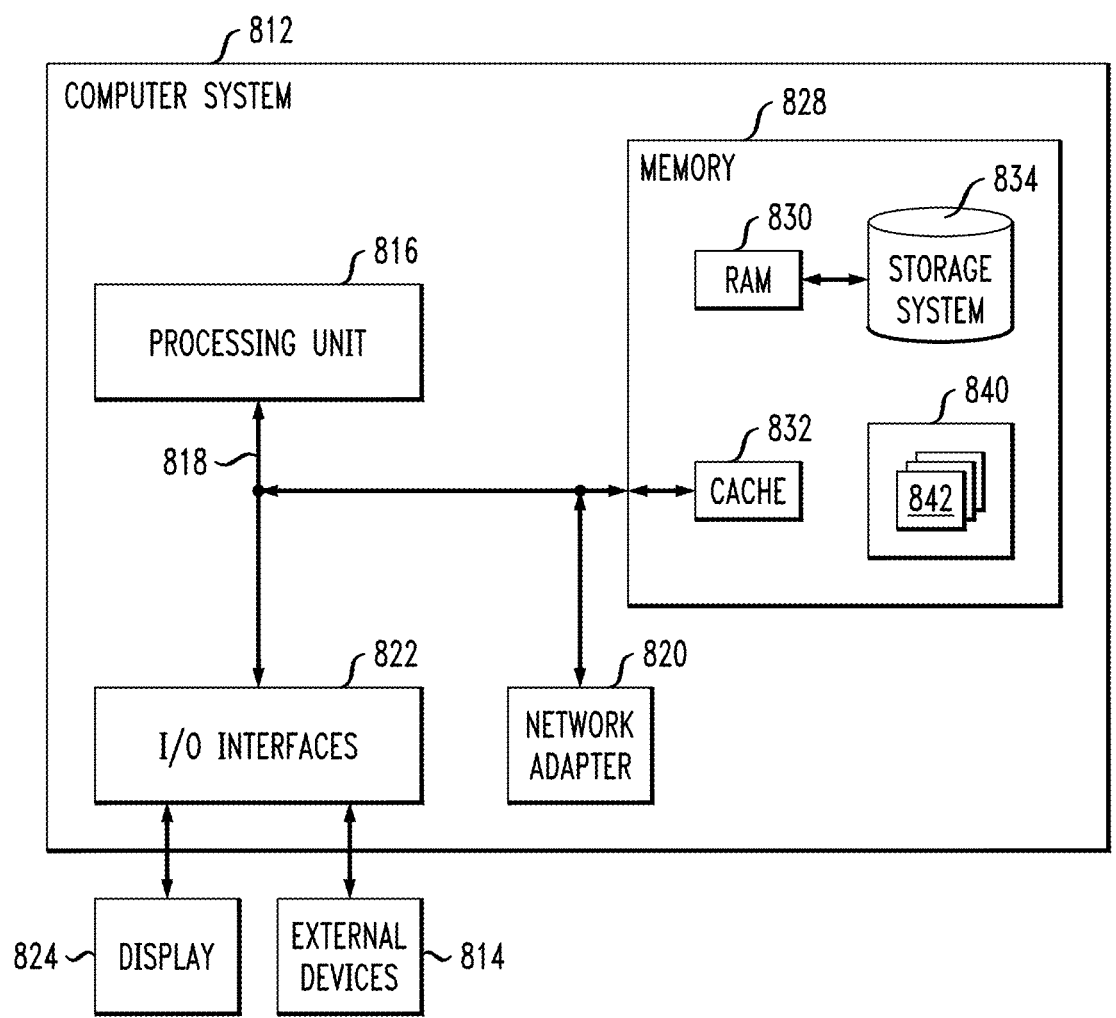
FIG. 8 illustrates a computer system in accordance with which one or more components/steps of techniques of the invention may be implemented according to an embodiment of the invention.

One or more embodiments can make use of software running on a computer or workstation. With reference to FIG. 8, in a computing node 810 there is a system/server 812, which is operational with numerous other general purpose or special purpose computing system environments or configurations. Examples of well-known computing systems, environments, and/or configurations that may be suitable for use with system/server 812 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Each computing node in the computing platform 800 can implement the architecture shown in computing node 810.

System/server 812 may be described in the general context of computer system executable instructions, such as program modules, being executed by a computer system. Generally, program modules may include routines, programs, objects, components, logic, data structures, and so on that perform particular tasks or implement particular abstract data types. System/server 812 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, system/server 812 is shown in the form of a computing device. The components of system/server 812 may include, but are not limited to, one or more processors or processing units 816, system memory 828, and bus 818 that couples various system components including system memory 828 to processor 816.

Bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

System/server 812 typically includes a variety of computer system readable media. Such media may be any available media that is accessible by system/server 812, and it includes both volatile and non-volatile media, removable and non-removable media.

The system memory 828 can include computer system readable media in the form of volatile memory, such as random access memory (RAM) 830 and/or cache memory 832. System/server 812 may further include other removable/non-removable, volatile/nonvolatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 818 by one or more data media interfaces.

As depicted and described herein, memory 828 may include at least one program product having a set (e.g., at least one) of program modules that are configured to carry out the functions of embodiments of the invention. A program/utility 840, having a set (at least one) of program modules 842, may be stored in memory 828 by way of example, and not limitation, as well as an operating system, one or more application programs, other program modules, and program data. Each of the operating system, one or more application programs, other program modules, and program data or some combination thereof, may include an implementation of a networking environment. Program modules 842 generally carry out the functions and/or methodologies of embodiments of the invention as described herein.

System/server 812 may also communicate with one or more external devices 814 such as a keyboard, a pointing device, an external data storage device (e.g., a USB drive), a display 824, one or more devices that enable a user to interact with system/server 812, and/or any devices (e.g., network card, modem, etc.) that enable system/server 812 to communicate with one or more other computing devices. Such communication can occur via I/O interfaces 822. Still yet, system/server 812 can communicate with one or more networks such as a LAN, a general WAN, and/or a public network (e.g., the Internet) via network adapter 820. As depicted, network adapter 820 communicates with the other components of system/server 812 via bus 818. It should be understood that although not shown, other hardware and/or software components could be used in conjunction with system/server 812. Examples include, but are not limited to, microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
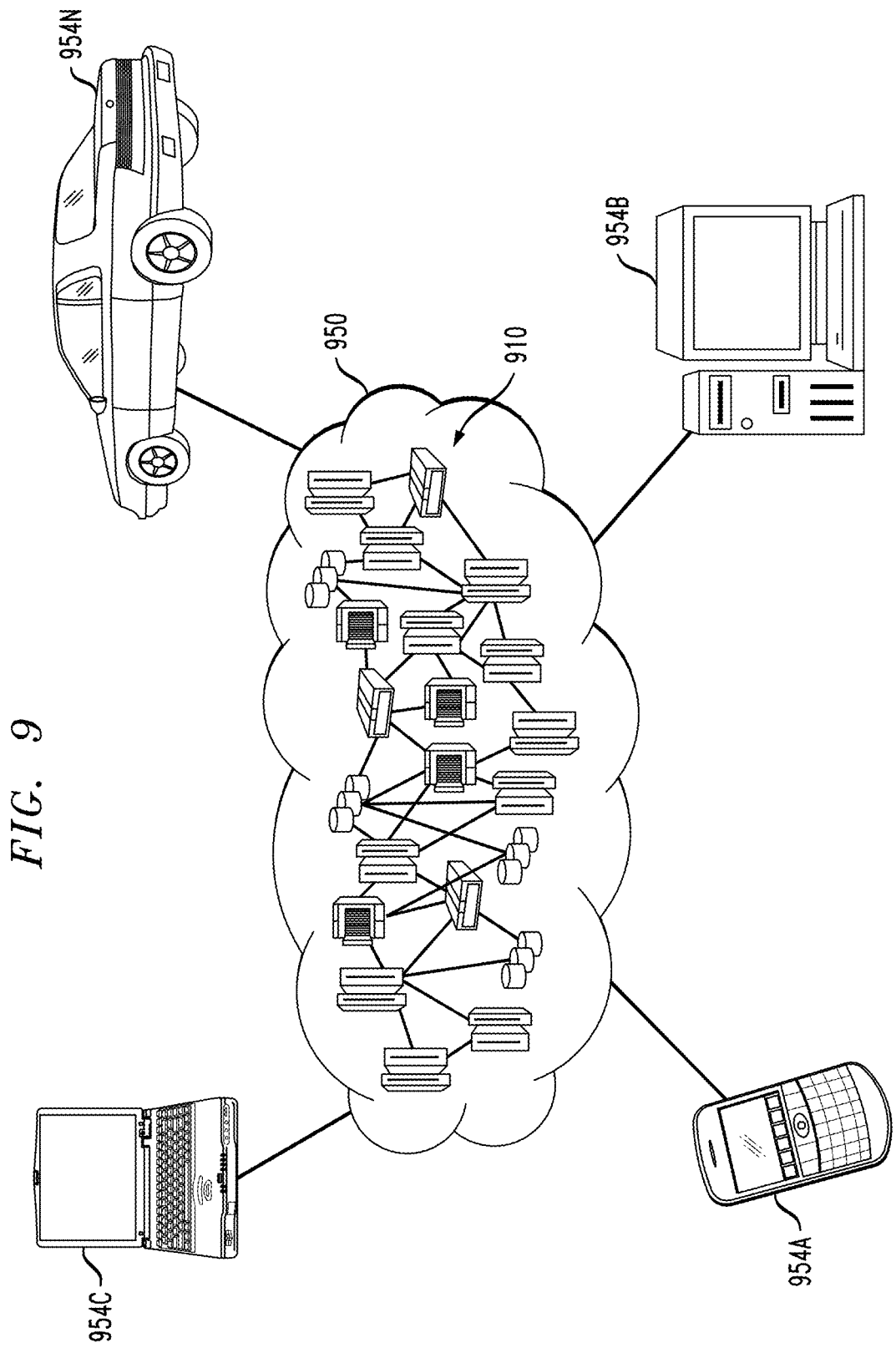
FIG. 9 illustrates a cloud computing environment according to an embodiment of the invention.

Referring now to FIG. 9, illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
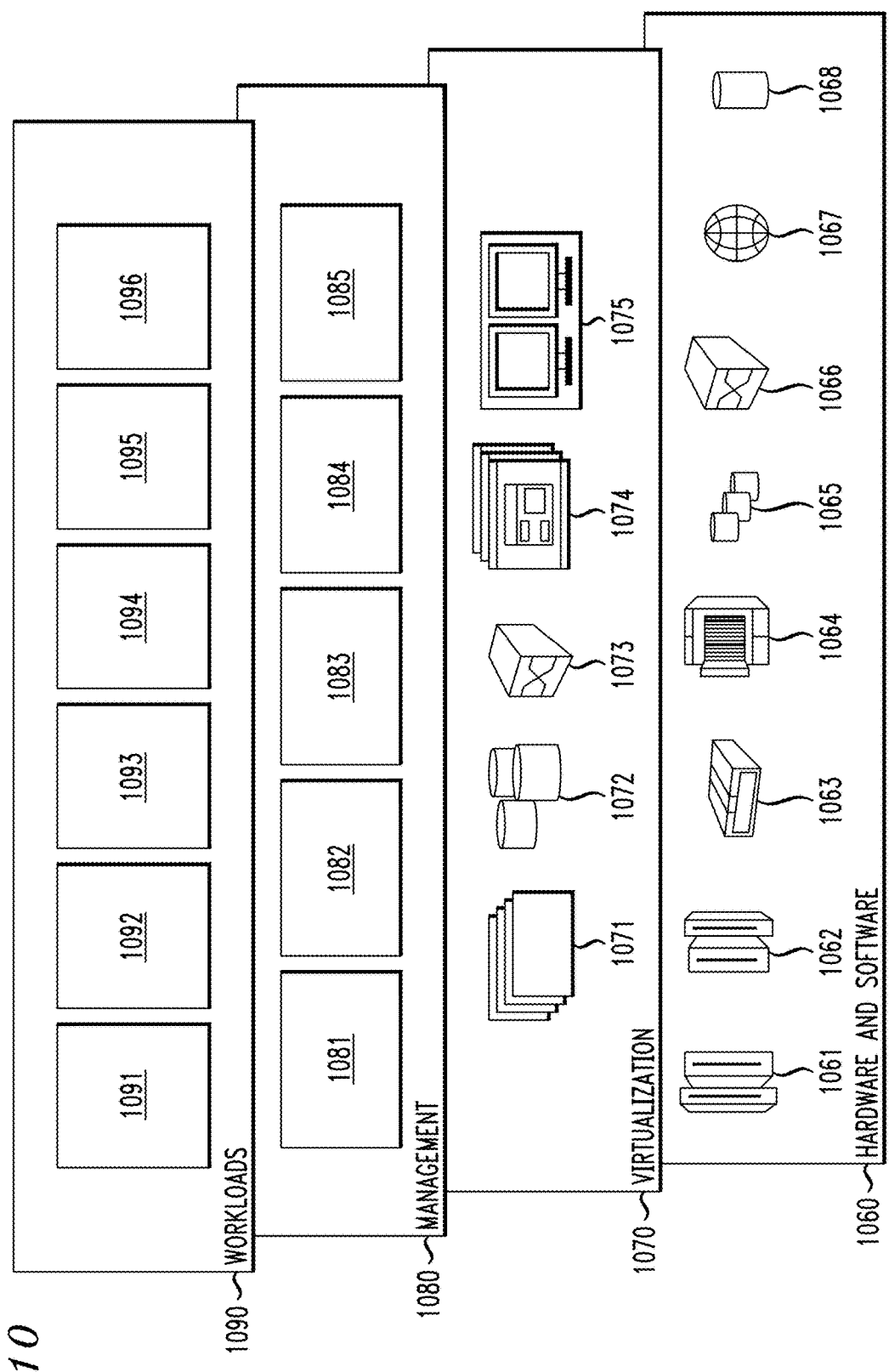
FIG. 10 illustrates abstraction model layers according to an embodiment of the invention.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: data measurement 1091; data transmission 1092; data analytics processing 1093; model calculation 1094; model generalization 1095; and injection automation 1096, which may perform various functions described above.

Embodiments of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although illustrative embodiments have been described herein with reference to the accompanying drawings, it is to be understood that the invention is not limited to those precise embodiments, and that various other changes and modifications may be made by one skilled in the art without departing from the scope or spirit of the invention.

What is claimed is:

1. An apparatus to perform tests on fluid flow, the apparatus comprising:
one or more vessels;
one or more sets of fluid injecting devices corresponding to respective ones of the one or more vessels, wherein each set of fluid injecting devices comprises a first fluid injecting device and a second fluid injecting device each configured to inject a respective immiscible fluid through a respective vessel, wherein the first fluid injecting device is configured to inject a first immiscible fluid through the respective vessel and the second fluid injecting device is configured to inject a second immiscible fluid through the respective vessel, the first immiscible fluid and the second immiscible fluid thereby forming a fluid-fluid interface between the first immiscible fluid and the second immiscible fluid; and one or more measurement devices operatively coupled to respective ones of the one or more vessels, the one or more measurement devices comprising a plurality of piezoelectric devices embedded within the one or more vessels, the plurality of piezoelectric devices being embedded at different locations along lengths of the one or more vessels, the one or more measurement devices being configured to directly measure local pressure of the first immiscible fluid and second immiscible fluid injected into the respective vessel at the different locations along the length of the respective vessel using the plurality of piezoelectric devices;

wherein the apparatus is in communication with at least one processor;

the at least one processor being configured:
to indirectly determine a speed of motion of the fluid-fluid interface between the first immiscible fluid and the second immiscible fluid by detecting, via electrical current jump, when the fluid-fluid interface between the first immiscible fluid and the second immiscible fluid passes each of the plurality of piezoelectric devices embedded at the different locations along the lengths of the one or more vessels; and
to calculate a model based at least in part on the measured data and the indirectly determined speed of motion of the fluid-fluid interface between the first immiscible fluid and the second immiscible fluid;

wherein calculating the model comprises:
determining an initial set of fitting parameters as a set of fitting parameters;
solving a characteristic model using the set of fitting parameters;
locating errors between the characteristic model and the measured data;
validating the characteristic model in response to determining that the set of fitting parameters meet one or more error requirements; and
in response to the set of fitting parameters not meeting one or more error requirements, (i) obtaining a new set of fitting parameters as the set of fitting parameters; and (ii) re-solving the characteristic model using the new set of fitting parameters set until a set of fitting parameters is determined to meet the one or more error requirements.

2. The apparatus of claim 1, wherein the one or more vessels comprise one or more capillaries.

3. The apparatus of claim 1, wherein the one or more vessels comprise one or more flexible tubes.

4. The apparatus of claim 1, wherein the one or more vessels comprise at least one of a channel comprising a curved pathway and a channel comprising a patterned surface.

5. The apparatus of claim 1, wherein the one or more vessels are implemented with one or more variable cross section devices.

6. The apparatus of claim 1, wherein each of the first and second fluid injecting devices comprise a syringe.

7. The apparatus of claim 6, wherein the first and second fluid injecting devices further comprise one or more syringe pumps operatively coupled to respective ones of the syringes and configured to control a flow rate of the first and second immiscible fluids.

8. The apparatus of claim 1, wherein the one or more measurement devices comprise one or more pressure transducers.

9. The apparatus of claim 1, further comprising a controller in communication with the at least one processor and configured to automate the injection of each fluid through its respective vessel.

10. The apparatus of claim 1, wherein the at least one processor is further configured to create a generalized model based on the calculated model.

11. A method comprising:
receiving data associated with fluid flow of a first immiscible fluid injected into a respective vessel and a second immiscible fluid injected into the respective vessel, the first immiscible fluid and the second immiscible fluid thereby forming a fluid-fluid interface between the first immiscible fluid and the second immiscible fluid, wherein the received data comprises direct measurements of local pressure of the first immiscible fluid and second immiscible fluid injected into the respective vessel at different locations along a length of the respective vessel using a plurality of piezoelectric devices embedded within the respective vessel;
indirectly determining a speed of motion of the fluid-fluid interface between the first immiscible fluid and the second immiscible fluid by detecting, via electrical current jump, when the fluid-fluid interface between the first immiscible fluid and the second immiscible fluid passes each of the plurality of piezoelectric devices embedded at the different locations along the lengths of the one or more vessels; and
calculating a model based at least in part on the received data and the indirectly determined speed of motion of the fluid-fluid interface between the first immiscible fluid and the second immiscible fluid;
wherein calculating the model comprises:
determining an initial set of fitting parameters as a set of fitting parameters;
solving a characteristic model using the set of fitting parameters;
locating errors between the characteristic model and the measured data;
validating the characteristic model in response to determining that the set of fitting parameters meet one or more error requirements; and
in response to the set of fitting parameters not meeting one or more error requirements, (i) obtaining a new set of fitting parameters as the set of fitting parameters; and (ii) re-solving the characteristic model using the new set of fitting parameters set until a set of fitting parameters is determined to meet the one or more error requirements; and
wherein the steps of the method are implemented via at least one processor operatively coupled to a memory.

12. The method of claim 11, further comprising creating a generalized model based on the calculated model.

13. The method of claim 12, wherein creating the generalized model comprises:
compiling fitting parameters of one or more experimental tests of the received data;
applying a test to eliminate outliers from the compiled fitting parameters;
finding generalized fitting parameters using a statistical validation model; and
determining the generalized model based on one or more conditions of the one or more experimental tests.

14. The method of claim 13, wherein the one or more conditions comprise at least one of an operational condition and a rheological condition.

15. The apparatus of claim 10, wherein creating the generalized model comprises:
compiling fitting parameters of one or more experimental tests of the received data;
applying a test to eliminate outliers from the compiled fitting parameters;
finding generalized fitting parameters using a statistical validation model; and
determining the generalized model based on one or more conditions of the one or more experimental tests.

16. An article of manufacture comprising a computer-readable storage medium having encoded therein executable code of one or more software programs, wherein the one or more software programs when executed by one or more processors implement the steps of:
receiving data associated with fluid flow of a first immiscible fluid injected into a respective vessel and a second immiscible fluid injected into the respective vessel, the first immiscible fluid and the second immiscible fluid thereby forming a fluid-fluid interface between the first immiscible fluid and the second immiscible fluid, wherein the received data comprises, direct measurements of local pressure of the first immiscible fluid and second immiscible fluid injected into the respective vessel at different locations along a length of the respective vessel using a plurality of piezoelectric devices embedded within the respective vessel;
and indirectly determining a speed of motion of the fluid-fluid interface between the first immiscible fluid and the second immiscible fluid by detecting, via electrical current jump, when the fluid-fluid interface between the first immiscible fluid and the second immiscible fluid passes each of the plurality of piezoelectric devices embedded at the different locations along the lengths of the one or more vessels;
and calculating a model based at least in part on the received data and the indirectly determined speed of motion of the fluid-fluid interface between the first immiscible fluid and the second immiscible fluid;
wherein calculating the model comprises:
determining an initial set of fitting parameters as a set of fitting parameters;
solving a characteristic model using the set of fitting parameters;
locating errors between the characteristic model and the measured data;
validating the characteristic model in response to determining that the set of fitting parameters meet one or more error requirements;
and in response to the set of fitting parameters not meeting one or more error requirements, (i) obtaining a new set of fitting parameters as the set of fitting parameters;
and (ii) re-solving the characteristic model using the new set of fitting parameters set until a set of fitting parameters is determined to meet the one or more error requirements.

17. The article of claim 16, further comprising creating a generalized model based on the calculated model, wherein creating the generalized model comprises:
compiling fitting parameters of one or more experimental tests of the received data;
applying a test to eliminate outliers from the compiled fitting parameters;
finding generalized fitting parameters using a statistical validation model; and
determining the generalized model based on one or more conditions of the one or more experimental tests.

18. The article of claim 17, wherein the one or more conditions comprise at least one of an operational condition and a rheological condition.

19. The apparatus of claim 15, wherein the one or more conditions comprise at least one of an operational condition and a rheological condition.

* * * * *